United States Patent
Gorenzweig et al.

(10) Patent No.: US 10,000,099 B2
(45) Date of Patent: Jun. 19, 2018

(54) TIRE PRESSURE MONITORING UNIT HAVING A TWO-COMPONENT HOUSING

(71) Applicant: HUF HUELSBECK & FUERST GMBH & CO. KG, Velbert (DE)

(72) Inventors: Igor Gorenzweig, Wuppertal (DE); Stefan Monig, Schwelm (DE)

(73) Assignee: HUF HUELSBECK & FUERST GMBH & CO. KG, Velbert (DE)

( * ) Notice: Subject to any disclaimer, the term of this patent is extended or adjusted under 35 U.S.C. 154(b) by 0 days. days.

(21) Appl. No.: 15/503,557

(22) PCT Filed: Jul. 15, 2015

(86) PCT No.: PCT/EP2015/001448
§ 371 (c)(1),
(2) Date: Feb. 13, 2017

(87) PCT Pub. No.: WO2016/023607
PCT Pub. Date: Feb. 18, 2016

(65) Prior Publication Data
US 2017/0232807 A1   Aug. 17, 2017

(30) Foreign Application Priority Data
Aug. 14, 2014 (DE) .............. 10 2014 011 949

(51) Int. Cl.
*B60C 23/02* (2006.01)
*B60C 23/04* (2006.01)
(Continued)

(52) U.S. Cl.
CPC ...... *B60C 23/0494* (2013.01); *B29C 45/0055* (2013.01); *B29C 45/1676* (2013.01); *B60C 23/0493* (2013.01); *B29L 2031/32* (2013.01)

(58) Field of Classification Search
None
See application file for complete search history.

(56) References Cited

U.S. PATENT DOCUMENTS 5,540,092 A   7/1996 Handfield et al.
6,016,102 A * 1/2000 Fortune ............... B60C 23/0408
                                                  200/61.25
(Continued)

FOREIGN PATENT DOCUMENTS

| EP | 1510370 A1 | 3/2005 |
| EP | 1939017 A1 | 7/2008 |
| GB | 2501124 A | 10/2013 |

OTHER PUBLICATIONS

International Preliminary Report on Patentability (IPRP) dated Feb. 14, 2017, for PCT/EP2015/001448, and English translation thereof.
(Continued)

*Primary Examiner* — Andre Allen
(74) *Attorney, Agent, or Firm* — Bacon & Thomas, PLLC

(57) ABSTRACT

The invention relates to a tire pressure monitoring unit for arranging within a motor vehicle tire for sensing the tire filling pressure, wherein the tire pressure monitoring unit has a housing, in which electronic parts and at least one pressure sensor are arranged, wherein the housing has an air inlet, by means of which the tire filling pressure is applied to the pressure sensor, wherein the housing is designed as a multi-component plastic injection-molded part, in particular a two-component plastic injection-molded part, wherein a first component forms a lower housing shell and an upper housing shell and wherein a second component forms a seal between the air inlet and the pressure sensor. The invention further relates to a method for producing a tire pressure monitoring unit.

14 Claims, 7 Drawing Sheets

(51) Int. Cl.
    *B29C 45/16*     (2006.01)
    *B29C 45/00*     (2006.01)
    *B29L 31/32*     (2006.01)

(56) References Cited

U.S. PATENT DOCUMENTS

| | | | |
|---|---|---|---|
| 2002/0029627 A1* | 3/2002 | Delaporte | B60C 23/0408 73/146.2 |
| 2006/0130571 A1* | 6/2006 | Thrush | B60C 23/0408 73/146.2 |
| 2007/0295076 A1* | 12/2007 | Blossfeld | B60C 23/0408 73/146.8 |
| 2012/0222477 A1* | 9/2012 | Yu | B60C 23/0471 73/146 |
| 2015/0068297 A1* | 3/2015 | Duffy | B60C 23/0494 73/146.8 |
| 2015/0282335 A1* | 10/2015 | Biegner | H05K 5/0004 361/752 |

OTHER PUBLICATIONS

International Search Report (ISR) dated Oct. 14, 2015, for PCT/EP2015/001448.

* cited by examiner

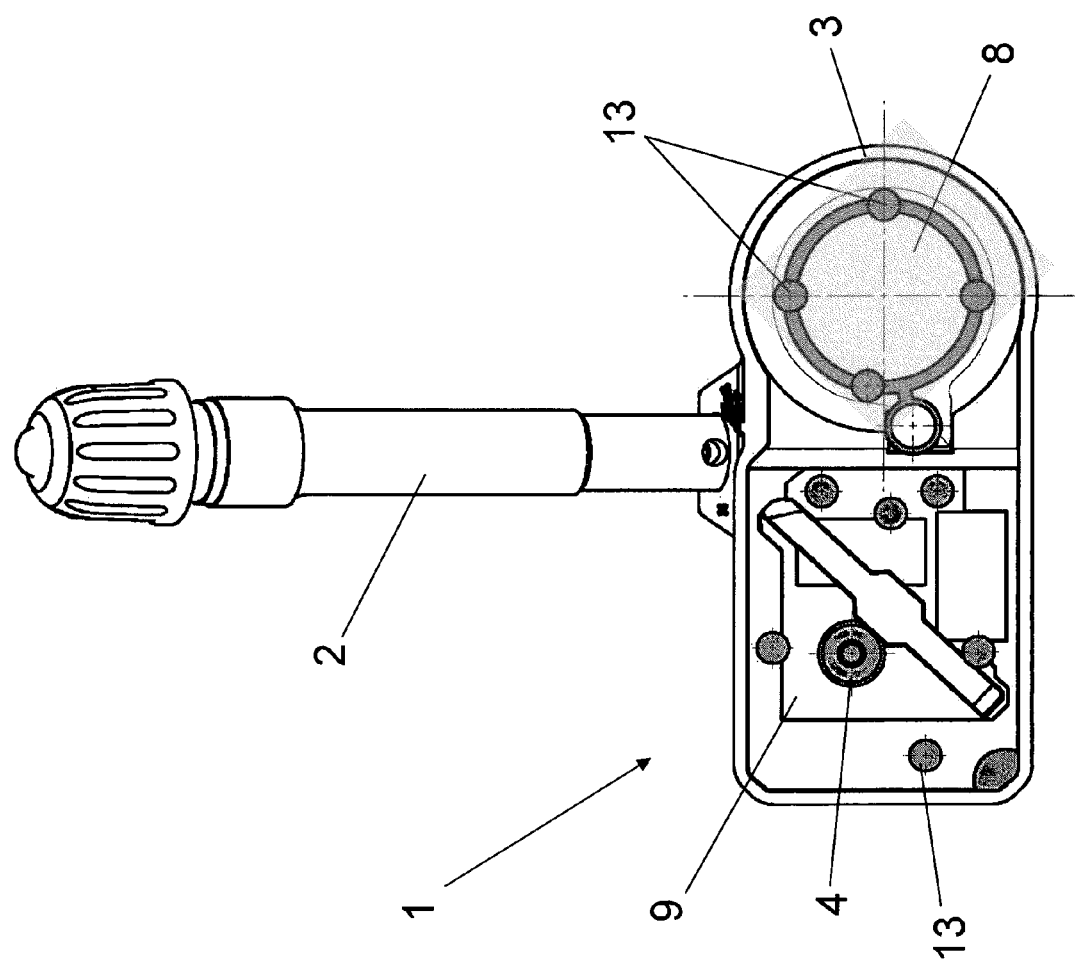

TIRE PRESSURE MONITORING UNIT HAVING A TWO-COMPONENT HOUSING

The invention relates to a tire-pressure monitoring unit for arrangement within a motor vehicle tire for monitoring the tire filling pressure, wherein the tire-pressure monitoring unit comprises a housing, in which electronic components and at least one pressure sensor are arranged.

Furthermore, the invention relates to a method for producing a tire-pressure monitoring unit for arrangement within a motor vehicle tire for detecting the tire filling pressure, which comprises a housing in which electronic components and at least one pressure sensor are arranged.

BACKGROUND OF THE INVENTION

Such tire-pressure monitoring units for monitoring the tire filling pressure of a motor vehicle are known. During operation, these tire-pressure monitoring units transmit information about the tire filling pressure to a central unit of the motor vehicle in a wireless manner. The tire-pressure monitoring units of all tires of a motor vehicle form a tire-pressure monitoring system together with the central unit. Within the tire, said tire-pressure monitoring units for monitoring the tire filling pressure are leaned or pressed against the rim.

In order to protect the electronic components arranged within the housing of the tire-pressure monitoring unit against moisture, it is known to insert the electronic components in a lower housing shell of the tire-pressure monitoring unit and, afterwards, cast the lower housing shell with a curing casting material in such a way that the electronic components are completely enclosed and protected by the casting material.

However, the disadvantage of said approach lies with the fact that the tire-pressure monitoring unit has a great mass because the housing of a such tire-pressure monitoring unit is completely cast with a curing casting material, leading to high and rapidly increasing centrifugal forces at high driving speed, since such tire-pressure monitoring units are arranged on the rim within the tire of the motor vehicle. In the worst case, the resulting centrifugal forces may cause the tire-pressure monitoring unit to detach from the rim and be damaged, and a valve mounted on the tire-pressure monitoring unit detaches and breaks.

SUMMARY OF THE INVENTION

The object of the invention is to further develop a tire-pressure monitoring unit of the above-mentioned type in such a way that it provides good protection of the electronic components within the housing against moisture along with a smaller total mass of the tire-pressure monitoring unit. Another object of the invention is to provide a method for producing a corresponding tire-pressure monitoring unit.

According to the invention, said object is achieved by a tire-pressure monitoring unit as well as a method for producing a tire-pressure monitoring unit. Advantageous developments of the invention are specified in the detailed description of the invention.

In the tire-pressure monitoring unit for arrangement within a motor vehicle for detecting the tire filling pressure, wherein the tire-pressure monitoring unit comprises a housing in which electronic components and at least one pressure sensor are arranged, wherein the housing comprises an air inlet, via which the pressure sensor is applied with the tire filling pressure, it is of particular advantage that the housing is designed as a multicomponent plastic injection-molded part, in particular a two-component plastic injection-molded part, wherein a first component forms a lower housing shell and wherein an upper housing shell and wherein a second component forms a seal between the air inlet and the pressure sensor.

Thus, the inner housing space is sealed toward the air inlet by means of the seal formed by the second component, the inlet required to apply the pressure sensor with the tire filling pressure. The pressure sensor arranged within the housing is subjected with the tire filling pressure via the air inlet.

Arranging the second component of the housing formed as a two-component plastic injection-molded part in such a way that said second components forms a seal of the air inlet creates a reliable seal of the inner housing space toward the air inlet and thus toward to the environment. As a result, the electronic components arranged in the housing are protected against moisture in a reliably manner.

In a preferred embodiment, the second component forms a seal of the housing. This effects a sealing of the housing, i.e. in particular a sealing of the lower housing shell and the upper housing shell at the contact line of the two hosing shells.

Preferably, the second component forms supports and/or mounting regions for the electronic components within the housing.

The second component may thus assume different functions in an alternative or cumulative manner. First, the second component forms a seal of the air inlet in the housing, which serves to apply the pressure sensor with the tire filling pressure.

The second component may alternatively, or cumulatively, form a seal between the lower housing shell and the upper housing shell and/or supports and/or mounting regions for the electronic components within the housing.

Besides the function as a seal, the second softer component may thus at the same time serve to compensate tolerances when mounting the lower housing shell and upper housing shell, and also forms a protection against vibration and a shock absorber, thereby reliably protecting the electronic components and the sensor arranged in the tire-pressure monitoring unit.

Preferably, the second component is directly molded to the first component by injection-molding. According to the invention, the housing of the tire-pressure monitoring unit is particularly preferably a two-component plastic injection-molded part, but the invention is not limited thereto and it is possible to use one or more further components in a multi-component injection molding method in order to use another, different material property and/or a different color of the plastic material.

The use of a multi-component injection molding method, in particular a two-component injection molding method, allows combining two different plastic components that enter into a material-fit connection on the interface in such a way that different, but at the same time compatible materials can be injection-molded to one another to combine different material properties on one component. In the present case, the second component, which forms a seal and in particular support regions for the electric components within the housing, is more easily deformable than the first component, which forms the housing. Accordingly, a second component forming the seal is directly injection-molded to the first component when manufacturing the lower housing shell, for example, so that after mounting of the upper housing shell, which in turn is formed from the first component, a seal of the inner housing space toward the environment and thus a protection of the electronic components arranged in the housing against moisture is provided by the present seal. Thus, the lower housing shell and the upper housing shell are formed of a plastic component which is harder compared to the second component, while the second component constitutes the elastically-deformable component which is softer compared to the first component and which is therefore well suitable as a seal and/or vibration-damping support for the electronic components within the housing.

Thus the second component serves both to seal the inner housing space toward the environment and, in particular in a corresponding configuration of the tire-pressure monitoring unit, to compensate tolerances as well as furthermore to dampen vibration, since the second component is formed by an elastically-deformable plastic.

The first component, which forms the lower housing shell and the upper housing shell, can be formed of thermoplastic polymers such as polybutylene terephthalate (PBT), in particular also of glass-fiber reinforced polybutylene terephthalate, polyamide or polypropylene.

The second component, which forms a seal and/or support regions for the electronic components, can be formed by a thermoplastic elastomer such as styrene block copolymers, in particular SEPS, or thermoplastic copolyamide, for example.

The second component forming the seal and/or support regions may either be directly injection-molded to the lower housing shell formed from the first component, or can be directly injection-molded to the upper housing shell formed from the first component, or may be injection-molded to both the lower housing shell formed by the first component and to the upper housing shell formed by the first component.

According to the invention, the seal formed from the second component is designed in such a way that after joining the lower housing shell and upper housing shell so as to form the housing of the tire-pressure monitoring unit, the tire-pressure monitoring unit and the enclosed installation space having the electronic components arranged therein is sealed toward the environment by the seal formed by the second component. The electronic components arranged within the housing are protected thereby against environmental moisture.

Alternatively, or cumulatively to a seal of the air inlet formed from the second component as well as possibly a seal between the housing shells, the second component may furthermore form support regions and/or mounting regions for the electronic components within the housing.

Since the second component of the two-component injection-molded part can be deformed more easily than the first component, said second component simultaneously forms a vibration-damping support for the electronic components within the housing. Said damping of vibration by means of the second component within the housing of the tire-pressure monitoring unit formed as a two-component plastic injection-molded part reliably prevents damage of the electronic components, e.g. a circuit board, caused by vibration, which may occur in driving operation of the motor vehicle.

In particular, the electronic components arranged within the housing of the tire-pressure monitoring unit may comprise an energy source such as a battery, measuring and transmission electronics for processing the values of the tire filling pressure detected by the pressure sensor, as well as an antenna for radio transmission to a central unit of a tire-pressure monitoring system. Measuring and transmission electronics may in turn be arranged on a circuit board, which is installed in the housing of the tire-pressure monitoring unit.

Due to the fact that the housing is designed as a two-component plastic injection-molded part, which comprises a seal of the air inlet and in particular a seal between lower housing shell and upper housing shell and/or support regions for the electronic components, casting the electronic components with a casting material is no longer required after insertion of the electronic components and the at least one pressure sensor into the housing. As a result, the tire-pressure monitoring unit according to the invention has a lower mass. Arranging the tire-pressure monitoring unit within a tire on the wheel rim of the motor vehicle results in lower centrifugal forces even at high driving speed of the motor vehicle. This reduces the susceptibility of the sensor to detach from the wheel rim in case of high centrifugal forces and/or occurring vibration. In a combination of tire-pressure monitoring unit and a valve body having the filling valve to be guided through a respective bore in the rim, it is of particular advantage that the center of mass of the overall assembly is displaced to the periphery of the wheel, thereby further reducing the susceptibility of the tire-pressure monitoring unit to detach from the wheel.

Preferably, the first component and/or the second component of the housing of the tire-pressure monitoring unit designed as two-component plastic injection-molded part form positioning protrusions for the electronic components within the housing.

Said positioning protrusions may be pins and/or edges and/or support shoulders serving as positioning aids or mounting aids for the electronic components.

Arrangement of the electronic components in the positions inside the housing provided to that end and insertion of these components in the housing is considerably facilitated by means of such positioning aids and mounting aids.

Preferably, the electronic components are inserted in the lower housing shell and/or the upper housing shell in a form-fit and/or force-fit manner.

By arranging corresponding reception regions within the lower hosing shell and/or within the upper housing shell by means of the first component and/or the second component of the hosing designed as a two-component plastic injection-molded part, in which the electronic components are inserted in a form-fit and/or force-fit manner, the respective electronic component is secured within the housing and, furthermore, the final mounting process of the tire-pressure monitoring unit is facilitated when the electronic components are secured in one of the two components of the housing and are thereby arranged in an undetachable manner even before the final mounting process of the housing by joining the lower housing shell and the upper housing shell.

The electronic components are preferably arranged in the lower housing shell and/or the upper housing shell in such a way and are pressed against elastic support regions on the housing counterpart during assembly of the housing that the electronic components are secured under pre-stress of the housing when the housing is mounted.

By means of such elastic support regions on the housing counterpart, vibrations are dampened on the one hand, and the electric components are protected thereby. Furthermore, the electronic component is secured within the housing by the elastic deformation of the support regions on the housing counterpart.

Preferably, one or multiple foam insert/s is/are arranged between the lower housing shell and the electronic components and/or between the upper housing shell and the electronic components.

By means of such foam inserts, the electronic components are additionally protected against vibration. This counteracts damage of the electronic components caused by vibration in a reliable manner.

Preferably, protrusions formed by the first or second components are hot-stamped after insertion of the electronic components into the lower housing shell and/or upper housing shell, thereby securing the electronic parts within the housing.

This way, in particular positioning protrusions such as pins and/or edges and/or support shoulders for positioning and receiving the electronic components can be designed in such a way that in the raw or unprocessed state, they form protrusions after insertion of the electronic components, which can be hot-stamped by means of a tool, so that the material regions form securing elements engaging over the electronic components, and secure the electronic components within the housing after hot-stamping.

Preferably, the upper housing shell is latched into corresponding receptacles on the lower housing shell. Alternatively, or cumulatively, the upper housing shell may be screw-connected to the lower housing shell.

It is thus possible to latch and/or screw-connect the upper housing shell to the lower housing shell in order to assemble the housing. The inner housing space is reliably sealed toward the environment and the electronics arranged in the housing is protected against moisture by the seal between upper housing shell and lower housing shell formed by the second component.

In another particularly preferred embodiment, the upper housing shell is substance-bonded with and/or glued to the lower housing shell. In particular, the upper housing shell and the lower housing shell can be connected to one another by means of laser-welding or ultrasonic-welding.

Such a welding and/or bonding of the upper housing shell to the lower hosing shell also creates a reliable seal of the inner housing space toward the environment. In this case, the second component of the housing designed as a two-component plastic injection-molded part preferably serves to seal the air inlet, by means of which the pressure sensor is applied with the tire filling pressure, as well as a damping support for the electronic components within the housing.

Preferably, a pressure-compensation membrane is formed within the housing by the second component injection-molded to the first component. Such a pressure-compensation membrane formed by the second component serves for pressure compensation inside the housing in case of thermal fluctuations and resulting temperature expansions. Accordingly, such a pressure compensation membrane simultaneously serves to protect the electronic components arranged within the housing.

Such a pressure-compensation membrane may be formed by the second softer component in the form of a bellows.

The second, elastic component can therefore assume one or multiple functions, e.g. a sealing of the housing and in particular of the air inlet for applying the pressure sensor with the tire filling pressure, as a damping support and/or as a mounting region and support region for the electronic components within the housing, as shock absorber and protection against vibration for the electronic components, as a pressure-compensation membrane within the hosing as well as furthermore for the compensation of tolerances during assembly of the lower housing shell and the upper housing shell.

Preferably, the tire-pressure monitoring unit comprises a valve body with a valve for filling the tire. In particular, the housing of the tire-pressure monitoring unit and the valve body can be screw-connected to one another. To that end, the housing of the tire-pressure monitoring unit preferably comprises a mounting region for securing a valve body by means of a screw-connection to the housing of the tire-pressure monitoring unit.

This allows achieving a compact assembly which simultaneously comprises the housing having the electronic components arranged therein and at least one pressure sensor and, at the same time, a valve body having a valve for filling the tire. In the mounting process of the assembly group, the valve body is guided from the inside to the outside through a corresponding bore of the wheel rim of the motor vehicle in such a way that the tire-pressure monitoring unit remains on the wheel rim within the mounted motor vehicle tire.

In a method for producing a tire-pressure monitoring unit for arrangement within a tire of a motor vehicle for detecting the tire filling pressure, which comprises a housing in which electronic components and at least one pressure sensor are arranged, it is of particular advantage if the housing is produced by means of a multi-component plastic injection molding method, in particular a two-component plastic injection molding method, wherein a first component forms a lower housing shell and an upper housing shell and a second component forms a seal and/or support regions for the electronic components within the housing.

In the method for producing the tire-pressure monitoring unit, the second component may be directly injection-molded to the first component forming the lower housing shell. Alternatively or cumulatively, the seal and/or the support regions for the electronic components within the housing can be directly injection-molded to the first component forming the upper housing shell during the production process. By the use of the multi-component plastic injection-molding method, two plastic components having different material properties are combined, wherein the first component forms a rigid housing and the second component forms an elastic seal of the housing and/or elastic and dampening support regions for the electronic components within the housing. The housing inner space is thereby reliably sealed toward the environment and the electronic components arranged in the housing are protected against vibration after assembly of the upper housing shell and the lower housing shell.

Preferably, the second component is accordingly injection-molded to the first component.

Furthermore, protrusions formed by the first or second component are hot-stamped, thereby securing the electronic components inside the housing after insertion of the electronic components into the upper housing shell and/or lower housing shell.

BRIEF DESCRIPTION OF THE DRAWINGS

Several exemplary embodiments of the invention are illustrated in the figures and will be explained in greater detail here below. The figures show in:

FIG. 2 sectional views A-A and C-C according to FIG. 1a;

FIG. 5 sectional view D-D according to FIG. 4a;

FIG. 6 sectional views E-E and F-F according to FIG. 4a;

FIG. 7 a third embodiment of a tire-pressure monitoring unit without upper housing shell.

DETAILED DESCRIPTION OF THE INVENTION

FIG. 1 shows an overall view of a fully-assembled first embodiment of a tire-pressure monitoring unit 1 with closed housing and a valve 2 mounted thereto. The valve 2 comprises an outer protective cap 15 on its outer end. The overall arrangement is assembled such that the valve 2 is inserted from the inside outward through a bore in a wheel rim of a motor vehicle. Accordingly, the tire-pressure monitoring unit 1 remains on the wheel rim within the tubeless wheel for monitoring the tire filling pressure after the mounting process.

Figure 1B:
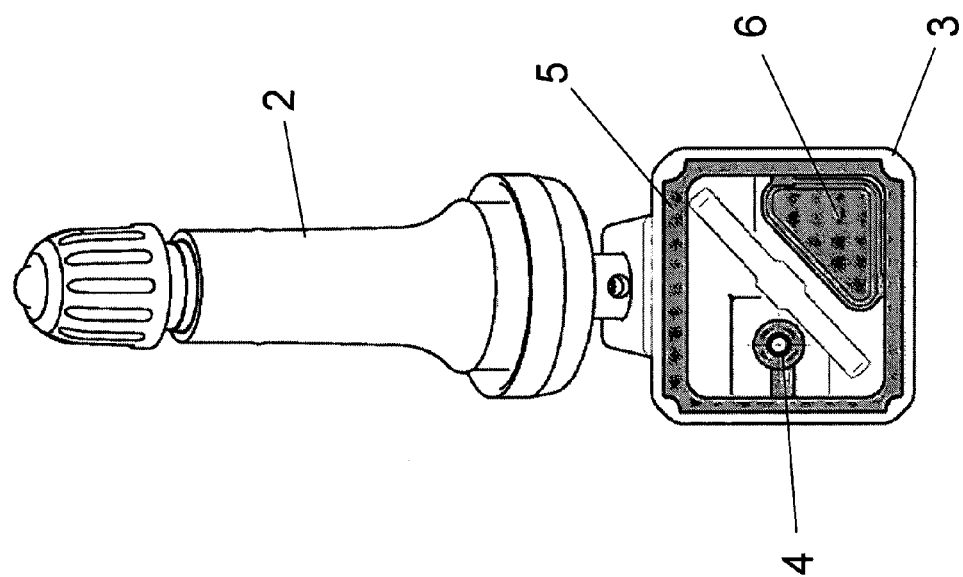
FIG. 1b the tire-pressure monitoring unit according to FIG. 1a without the upper housing shell.
Figure 1A:
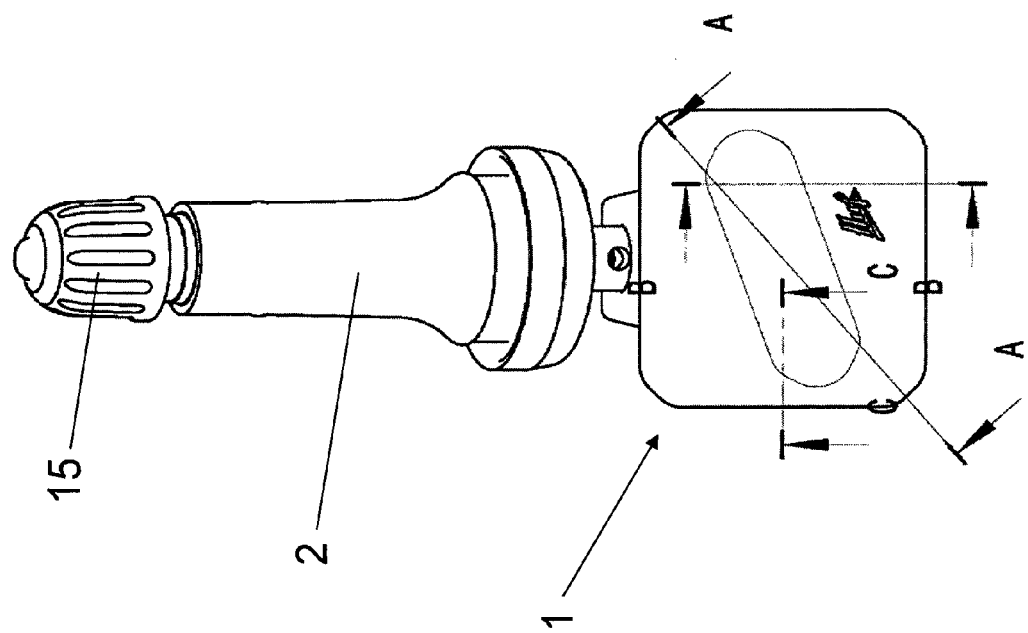
FIG. 1a a first embodiment of a tire-pressure monitoring unit with closed housing.

FIG. 1b shows the tire-pressure filling unit 1 according to FIG. 1a without the upper housing shell. Accordingly, the lower housing shell 3 designed as a two-component plastic injection-molded part can be discerned in a top view in FIG. 1b, with the seal 4 injection-molded thereto for sealing the air inlet, which serves to apply the pressure sensor, which in the mounted state is arranged within the housing, with the tire filling pressure. The seal 4 is formed by a second component directly injection-molded to the first component. In the cured state, the second component is the softer plastic component of the two components of the lower housing shell 3, so that the seal 4 is elastically deformable.

Furthermore, a circumferential seal 5 simultaneously constituting a tolerance compensation region between the two housing shells is formed.

Accordingly, the housing shell 3 is formed of the harder component of the two-component plastic injection-molded part, whereas the seal 4 of the air inlet and the seal 5 circumferentially arranged in the contact region between the two housing shells is formed of the softer component of the two-component plastic injection-molded part.

Furthermore, a pressure-compensation membrane is formed by the second component, the function of which is explained in greater detail below with reference to FIG. 3.

Figure 2:
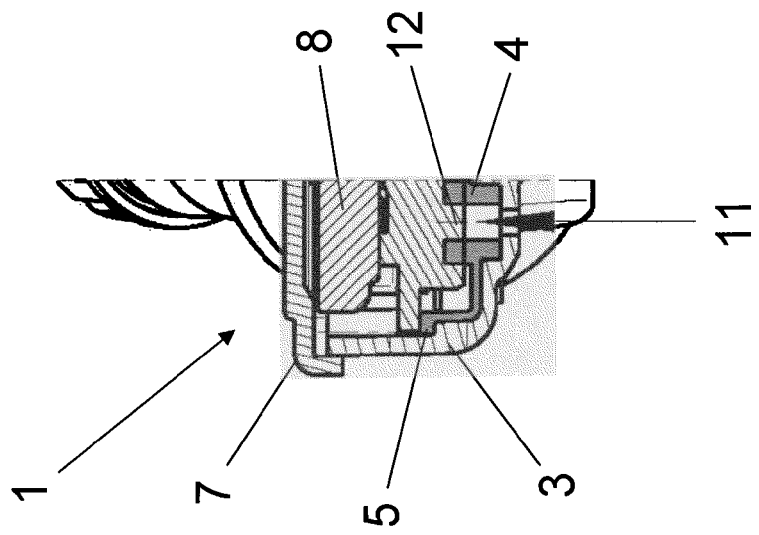
Figure 2:
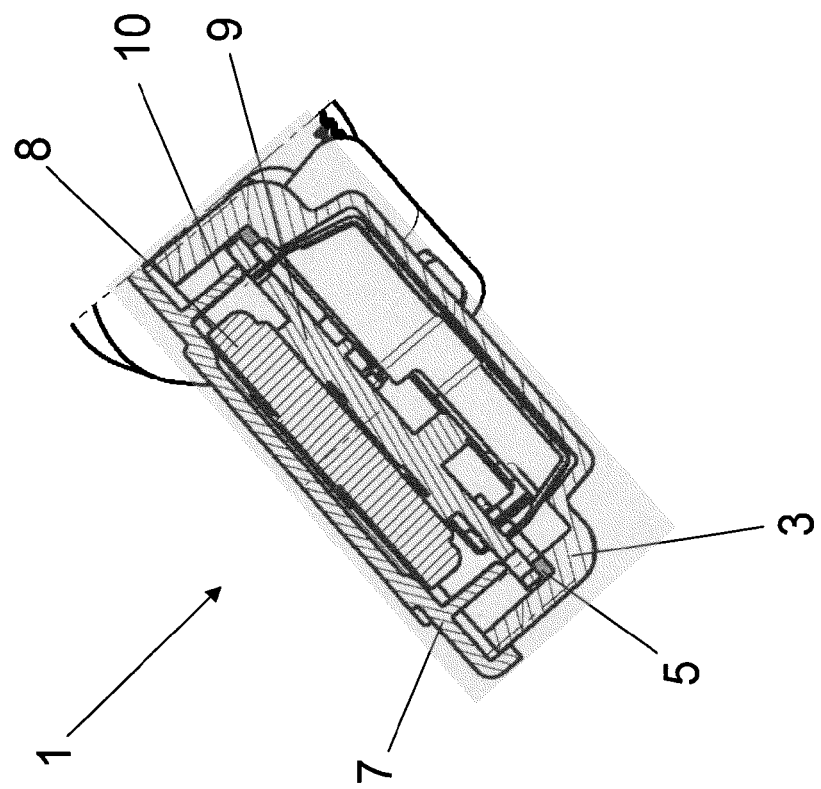

FIG. 2 shows the sectional views A-A and C-C according to FIG. 1a. The sandwiched structure of the tire-pressure monitoring unit 1, the housing of which is formed by the lower housing shell 3 and the upper housing shell 7, can be very well discerned in the illustration of sectional view A-A of FIG. 2. The battery 8 serving for power supply of the tire-pressure monitoring unit 1 is arranged within the housing. Below the battery 8, the circuit board 9 is arranged, having arranged thereon the electric components for evaluating and processing the signals of the pressure sensor arranged in the housing. Furthermore, an antenna for radio transmission of the pressure data to a central unit of a tire-pressure monitoring system in the motor vehicle is arranged on the circuit board 9.

Also discernable in FIG. 2 is the circumferential seal 5 between upper housing shell 7 and lower housing shell 3, as well as a support 10 arranged on the upper housing shell 7. In the present and the following exemplary embodiments, the circumferential seal 5 on the contact line between lower housing shell 3 and upper housing shell 7 simultaneously forms a damping element, by means of which the electronic components arranged within the housing are protected.

On the right hand of FIG. 2 is illustrated the sectional view C-C pursuant to FIG. 1a. In this illustration can be discerned the air inlet 11, via which the pressure sensor 12 arranged within the housing 12 is applied with the tire filling pressure. The seal 4 of the air inlet 11 is also discernable in the sectional view C-C. In the upper part, the valve 2 can be discerned and the circumferential seal 5 between the housing shells (lower housing shell 3 and upper housing shell 7) can be discerned in the sectional view C-C.

As explained, the seal 4 of the air inlet 11 as well as the circumferential seal 5 between the lower housing shell 3 and the upper housing shell 7 is formed by the second, softer component of the two-component plastic injection-molded part, whereas the housing 3 per se is formed by the harder component of the two-component plastic injection-molded part. Here, the sealing regions 4, 5 formed by the second component are directly injection-molded to the lower housing shell 3.

Figure 3:
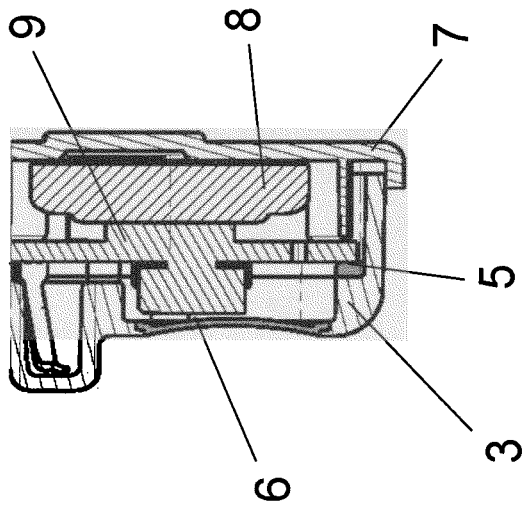
FIG. 3 sectional view B-B according to FIG. 1a in two variants.
Figure 3:
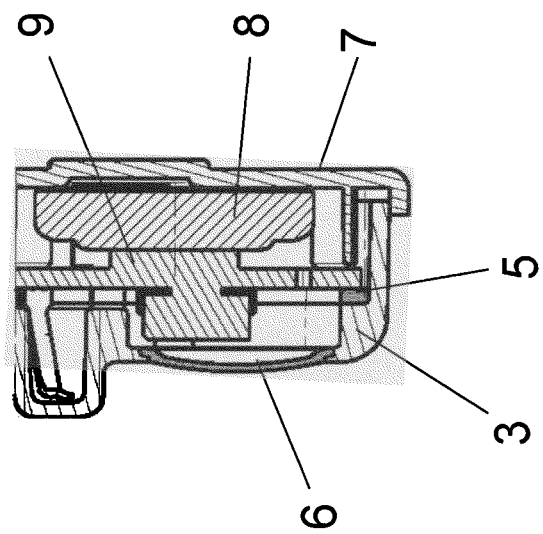

As can be taken from FIG. 1b, the pressure-compensation membrane 6 is also formed by the second, softer component of the two-component plastic injection-molded part, the functioning of which is discernable by means of FIG. 3. FIG. 3 shows sectional view B-B of FIG. 1a in two different versions with a negative pressure prevailing on the outer side in section B1-B1 and an excessive pressure prevailing on the outer side in the illustration of section B2-B2.

What can be discerned here is the behavior of membrane 6, which is curved outwards in the case that a negative pressure prevails on the outer side in section B1-B1, whereas membrane 6 pursuant to section B2-B2 is curved inwards in the case that an overpressure prevails on the outer side.

This pressure-compensation membrane 6 serves to compensate for pressure fluctuations occurring due to temperature fluctuations, for example. At high driving speed of the motor vehicle, the motor vehicle tire and therefore the air located therein heats up due to the flexing work of the tires, resulting in a correspondingly increased tire filling pressure.

Accordingly, the membrane 6 formed of the elastic second component serves as a pressure-compensation membrane 6 of the tire-pressure monitoring unit 1. In turn, the sectional views illustrated in FIG. 3 illustrate the sandwich-like structure of the tire-pressure monitoring unit having the battery 8 and the equipped circuit board 9. Furthermore, the circumferential elastic seal 5 can be discerned between the housing shells 3, 7, the seal simultaneously serving to compensate tolerances during the assembly of the tire-pressure monitoring 1.

Figure 4B:
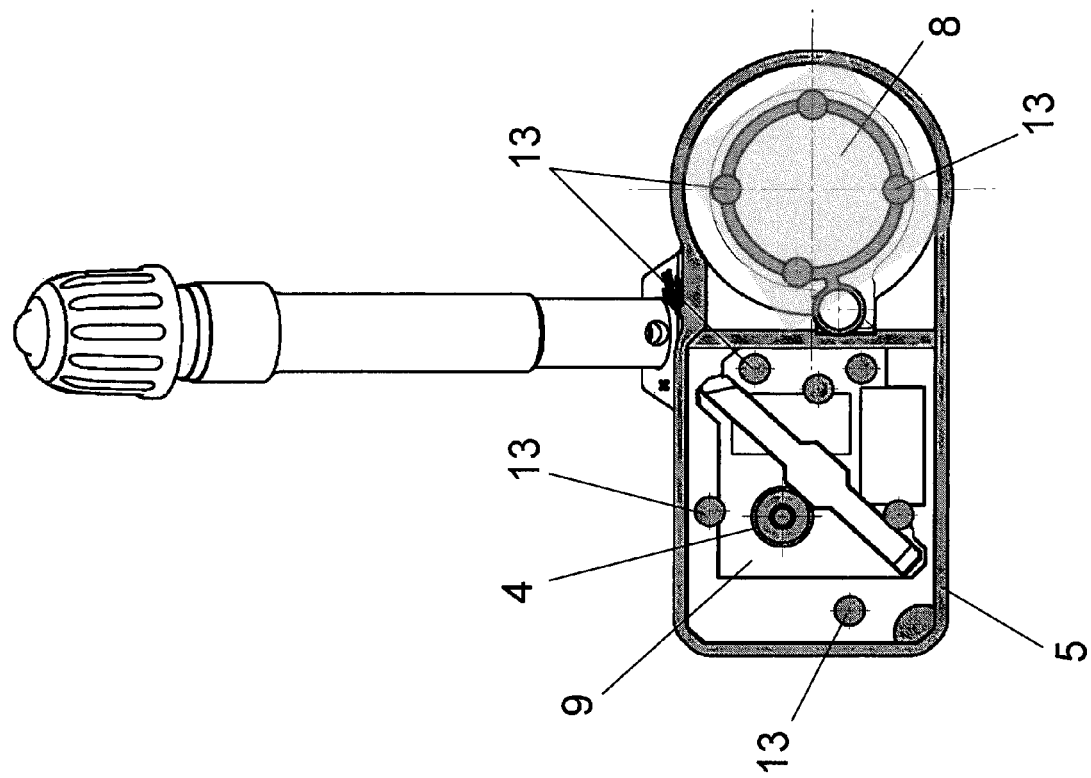
FIG. 4b the tire-pressure monitoring unit according to FIG. 4a without upper housing shell.
Figure 4A:
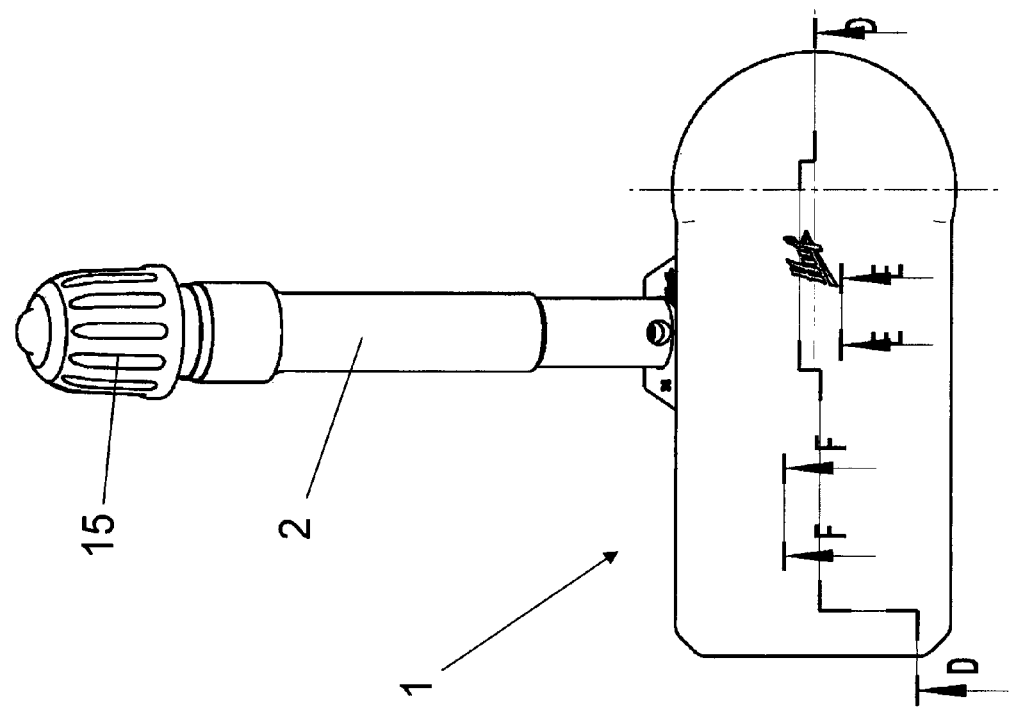
FIG. 4a a second embodiment of a tire-pressure monitoring unit with closed housing.

FIGS. 4a and 4b illustrate a second embodiment of a tire-pressure monitoring unit 1 with mounted valve 2. FIG. 4a shows the tire-pressure monitoring unit 1 with the valve 2 in the mounted state. FIG. 4a shows the fully-mounted tire-pressure monitoring unit 1 having the valve 2 and protection cap 3 of the valve 2. FIG. 4b shows the tire-pressure monitoring unit 1 according to FIG. 4a without upper housing shell.

The illustration according to FIG. 4 shows the lower housing shell 3 formed as a two-component injection-molded part, the base body of which is formed of the first, harder component of the plastic injection-molded part.

The second, more elastic component of the two-component plastic injection-molded part is directly injection-molded thereto, forming the seal 4 of the air inlet as well as a seal 5 running in the contact regions between the two housing shells 3 and 7, which forms a damping element at the same time.

Furthermore, positioning pins 13 are injection-molded to the lower housing shell 3, which on the one hand serve for the easier positioning and mounting of the battery 8 and the equipped circuit board 9 and at the same time constituting damping elements for protection of the circuit board 9 and the battery 8. In the exemplary embodiment illustrated in FIG. 4, circuit board 9 and battery 8 are positioned one behind the other.

The second component injection-molded to the lower housing shell 3 thus forms mounting aids 13 as well as the seal 4 of the air inlet as well as a seal 5 circumferentially running between the housing shells. In the fully-mounted state according to FIG. 4a, lower housing shell 3 and upper hosing shell 7 are connected to one another in a form-fit manner.

Figure 5:
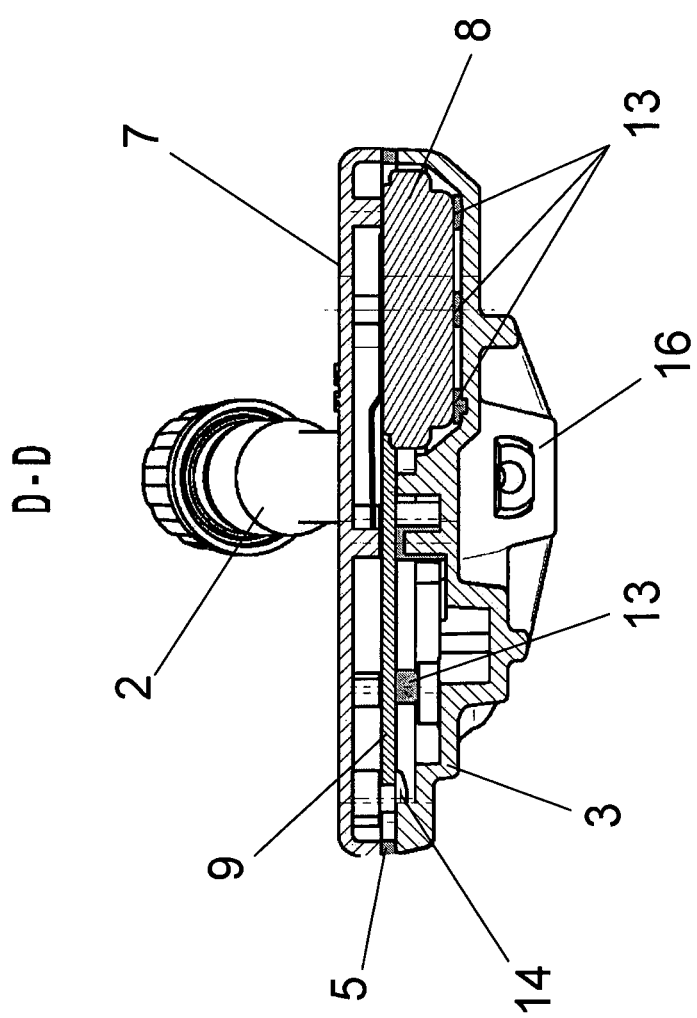

FIG. 5 illustrates section D-D according to FIG. 4a. Shown is the arrangement of the circuit board 9 and the battery 8 within the housing of the tire-pressure monitoring unit 1, formed by the lower housing shell 3 and the upper housing shell 7. Also discernable in section D-D according to FIG. 5 are the mounting and support regions 13, which are formed by the second component of the lower housing shell 3 formed as a two-component plastic injection-molded part. FIG. 5 also shows the mounting region 16, which serves to receive the screw connection for mounting the valve 2 to the tire-pressure monitoring unit 1 in order to realize one assembly unit composed of tire-pressure monitoring unit 1 and the valve 2.

The lower housing shell 2 comprises injection-molded pins for receiving and positioning the circuit board 9. As can be discerned in section D-D according to FIG. 5, the pins molded to the upper housing shell 7 are hot-stamped after the insertion of the circuit board 9, so that these form an undercut 14 securing the circuit board 9. The PCB 9 is thereby secured to the upper housing shell 7 and the mounting process is facilitated thereby.

Figure 6:
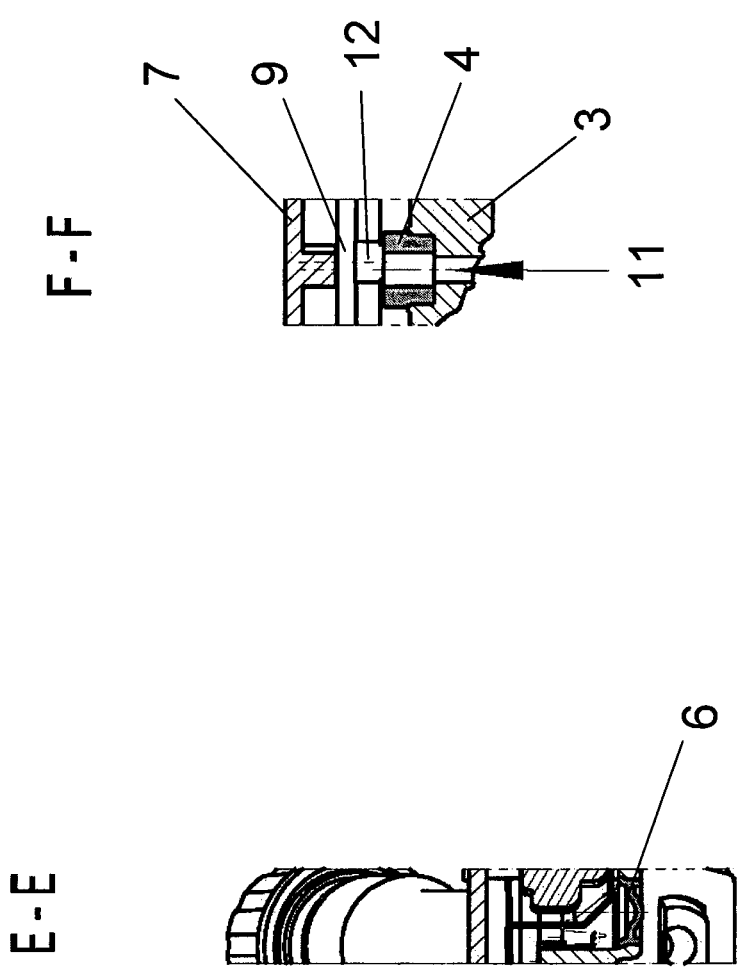

Sectional views E-E and F-F according to FIG. 4a are illustrated in FIG. 6. In FIG. 6 can be discerned the pressure-compensation membrane 6 formed by the second elastic component 6, the function and effects of which have been explained with respect to the first exemplary embodiment. In the second exemplary embodiment, the function of pressure-compensation membrane 6 is identical.

Sectional view F-F in FIG. 6 shows the arrangement of the air inlet 11, by means of which the pressure sensor 12 is applied with the tire filling pressure. Sectional view F-F also shows the seal 4 of the air inlet 11, which is formed by the second component of the two-component injection-molded part. The arrangement of the PCB 9 carrying the sensor 12 can also be discerned in the sectional view F-F of FIG. 6.

The first and second exemplary embodiment according to FIGS. 1 to 6 have in common that the lower housing shell 3 and the upper housing shell 7 are joined mechanically and a circumferential sealing region 5 is provided between the housing shells 3, 7.

In contrast, FIG. 7 shows a third embodiment of a tire-pressure monitoring unit 1, in which, in turn, the battery 8 and circuit board 9 are positioned in series. In the embodiment according to FIG. 7, housing lower shell 3 and housing upper shell 3 are connected in a substance-bonded manner, so that a circumferential seal between the housing shells can be omitted. In this case, merely a seal 4 formed by the second component of the hosing designed as a two-component injection-molded part of the air inlet is formed, by means of which the pressure sensor is applied with the tire filling pressure within the housing. Furthermore, positioning pins and damping supports 13 for receiving the battery 8 and the circuit board 9 are formed by the second elastic component in this exemplary embodiment. These elastic supports 13 protect particularly the circuit board 9 against damage caused by vibration. As the housing of the variant according to FIG. 7 is formed by a substance-bonded connection of the lower housing shell 3 and the upper housing shell 7, a circumferential sealing region between the housing shells can be omitted.

The invention claimed is:

1. A tire-pressure monitoring unit for arrangement within a motor vehicle tire for detecting the tire filling pressure, wherein the tire-pressure monitoring unit comprises a housing, in which electronic components and at least one pressure sensor are arranged, wherein the housing comprises an air inlet, via which the pressure sensor is applied with the tire filling pressure, wherein the housing is designed as a multi-component plastic injection-molded part, in particular as a two-component plastic injection-molded part, wherein a first component forms a lower hosing shell and an upper housing shell and wherein a second component forms a seal between the air inlet and the pressure sensor.

2. The tire-pressure monitoring unit according to claim 1, wherein the second component forms a seal of the housing.

3. The tire-pressure monitoring unit according to claim 1, wherein the second component forms supports and/or mounting regions for the electric components within the housing.

4. The tire-pressure monitoring unit according to claim 1, wherein the first component and/or second component forms positioning protrusions for the electronic components within the housing.

5. The tire-pressure monitoring unit according to claim 1, wherein the electronic components are inserted in the lower housing shell and/or the upper housing shell in a form-fit and/or force-fit manner.

6. The tire-pressure monitoring unit according to claim 1, wherein the electronic components, when assembling the housing, are pressed against elastic support regions on the housing counterpart in such a way that the electronic components are secured in the housing under pre-stress of the elastic support regions when the housing is mounted.

7. The tire-pressure monitoring unit according to claim 1, wherein one or multiple foam insert/s is/are arranged between the lower housing shell and the electronic components and/or between the upper housing shell and the electronic components.

8. The tire-pressure monitoring unit according to claim 1, wherein protrusions formed by the first or the second component are hot-stamped after insertion of the electronic components into the lower housing shell and/or upper housing shell, thereby securing the electronic components in the housing.

9. The tire-pressure monitoring unit according to claim 1, wherein the upper housing shell is latched with and/or screwed to corresponding receptacles on the lower housing shell.

10. The tire-pressure monitoring unit according to claim 1, wherein the upper housing shell is substance-bonded and/or glued to the lower housing shell, in particular laser-welded or ultrasonic-welded.

11. The tire-pressure monitoring unit according to claim 1, wherein a pressure-compensation membrane is formed within the housing by the second component.

12. A method for producing a tire-pressure monitoring unit for arrangement within a motor vehicle tire for detecting the tire filling pressure, which comprises a housing in which electronic components and at least one pressure sensor are arranged, in particular according to claim 1, wherein the housing is produced by multi-component plastic injection molding, in particular by two-component plastic injection molding, wherein a first component forms a lower housing shell and an upper housing shell and a second component forms a seal and/or support regions for the electronic components within the housing.

13. The method according to claim 12, wherein the second component is molded to the first component by injection-molding.

14. The method according to claim 12, wherein protrusions formed by the first or the second component are hot-stamped after insertion of the electronic components into the lower housing shell and/or upper housing shell, thereby securing the electronic components within the housing.

\* \* \* \* \*